(12) United States Patent
Douglas et al.

(10) Patent No.: US 10,101,895 B2
(45) Date of Patent: Oct. 16, 2018

(54) PRESENTATION OF IMAGES ON DISPLAY BASED ON USER-SPECIFIC COLOR VALUE(S)

(71) Applicant: Lenovo (Singapore) Pte. Ltd., New Tech Park (SG)

(72) Inventors: David W. Douglas, Cary, NC (US); Tin-Lup Wong, Chapel Hill, NC (US); Thomas James Shell, Morrisville, NC (US); Takumi Imai, Kamakura (JP); Osamu Masutani, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1 day.

(21) Appl. No.: 14/884,292

(22) Filed: Oct. 15, 2015

(65) Prior Publication Data

US 2017/0110089 A1    Apr. 20, 2017

(51) Int. Cl.
*G06F 3/0484* (2013.01)
*G06F 3/0489* (2013.01)

(52) U.S. Cl.
CPC ...... *G06F 3/04847* (2013.01); *G06F 3/04845* (2013.01); *G06F 3/04897* (2013.01)

(58) Field of Classification Search
CPC ......... G09G 5/02; G09G 5/06; G09G 2320/06
See application file for complete search history.

(56) References Cited

U.S. PATENT DOCUMENTS

| | | | | |
|---|---|---|---|---|
| 2008/0062192 A1* | 3/2008 | Voliter | ................ | G09G 5/06 345/591 |
| 2012/0147163 A1* | 6/2012 | Kaminsky | ............ | G09G 5/028 348/62 |
| 2014/0055506 A1* | 2/2014 | Chandel | ............... | G09G 3/2003 345/690 |
| 2015/0243052 A1* | 8/2015 | Park | .................... | G09G 5/02 345/589 |
| 2016/0001174 A1* | 1/2016 | Mott | .................... | A63F 13/822 3/822 |
| 2016/0086572 A1* | 3/2016 | Nasiriavanaki | ........ | G09G 5/026 345/590 |

OTHER PUBLICATIONS

"Introduction to ICC profiles." Sappi Fine Paper North America (c) 2013. Accessed via web on Jun. 5, 2017 @ https://www.sappietc.com/sites/default/files/Introduction%20to%20ICC%20Profiles.pdf.*
"Trillinear Interpolation", Wikipedia, Jul. 2, 2015, Retrieved on Jul. 3, 2015 from https://en.wikipedia.org/wiki/Trillinear_interpolation.
Alex Dobie, "Android L Includes New Display Modes for Color Blind Users", Jun. 27, 2015. Retrieved from http://www.androidcentral.com/android-l-includes-new-display-modes-color-blind-users on Jul. 3, 2015.
"EnChroma", retrieved from http://enchroma.com on Aug. 20, 2015.
"GPU Gems 2", NVIDIA Developer, retrieved on Aug. 20, 2015 from http://http.developer.nvidia.com/GPUGems2/gpugems2_chapter24.html.
"Three-Dimensional Lookup Table with Interpolation", retrieved on Aug. 20, 2015 from https://www.google.com/url?sa=t&rct=j&q=&esrc=s&source=web&cd=1&ved=0CB0QFjAAahUKEwiMr4DQnsXIAhVG3mMKHZXpC9c&url=http%3A%2F%2Fspie.org%2Fsamples%2FPM159.pdf&usg=AFQjCNHrTFT1E44_AmiaGFsDJFHmp6vp7g&sig2=1k3Q-V6wG_OriQERDKINDg&bvm=bv.105039540,d.cGc&cad=rja.

* cited by examiner

*Primary Examiner* — Antonio A Caschera
(74) *Attorney, Agent, or Firm* — John L. Rogitz; John M. Rogitz

(57) ABSTRACT

Data pertaining to at least one user-specific color value can be accessed for output of at least one of red light, green light, and blue light, and images can be presented on a display based at least in part on the at least one user-specific color value.

20 Claims, 10 Drawing Sheets

PRESENTATION OF IMAGES ON DISPLAY BASED ON USER-SPECIFIC COLOR VALUE(S)

FIELD

The present application relates generally to presentation of images on a display based on at least one user-specific color value.

BACKGROUND

Many people are affected by color vision deficiency (CVD), which hampers their ability to discern red or green color, and sometimes blue, color. This can be particularly problematic when trying to perceive images presented on a display, and currently no adequate remedies exist.

SUMMARY

Accordingly, in one aspect a device includes a processor, a display accessible to the processor, and storage accessible to the processor. The storage bears instructions executable by the processor to present, on the display, at least one multi-colored object. The instructions are also executable to receive, from a user, input in relation to the multi-colored object and establish reference data useable by the processor to reader images on the display based at least in part on the input.

In another aspect, a method includes accessing data pertaining to at least one user-specific color value for output of at least one of red light, green light, and blue light, and presenting images on a display based at least in part on the at least one user-specific color value.

In still another aspect, a computer readable storage medium that is not a transitory signal comprises instructions executable by a processor to access data pertaining to at least one user-specific color saturation value and present images on a display accessible to the processor based at least in part on the at least one user-specific color saturation value.

The details of present principles, both as to their structure and operation, can best be understood in reference to the accompanying drawings, in which like reference numerals refer to like parts, and in which:

DETAILED DESCRIPTION

Figure 1:
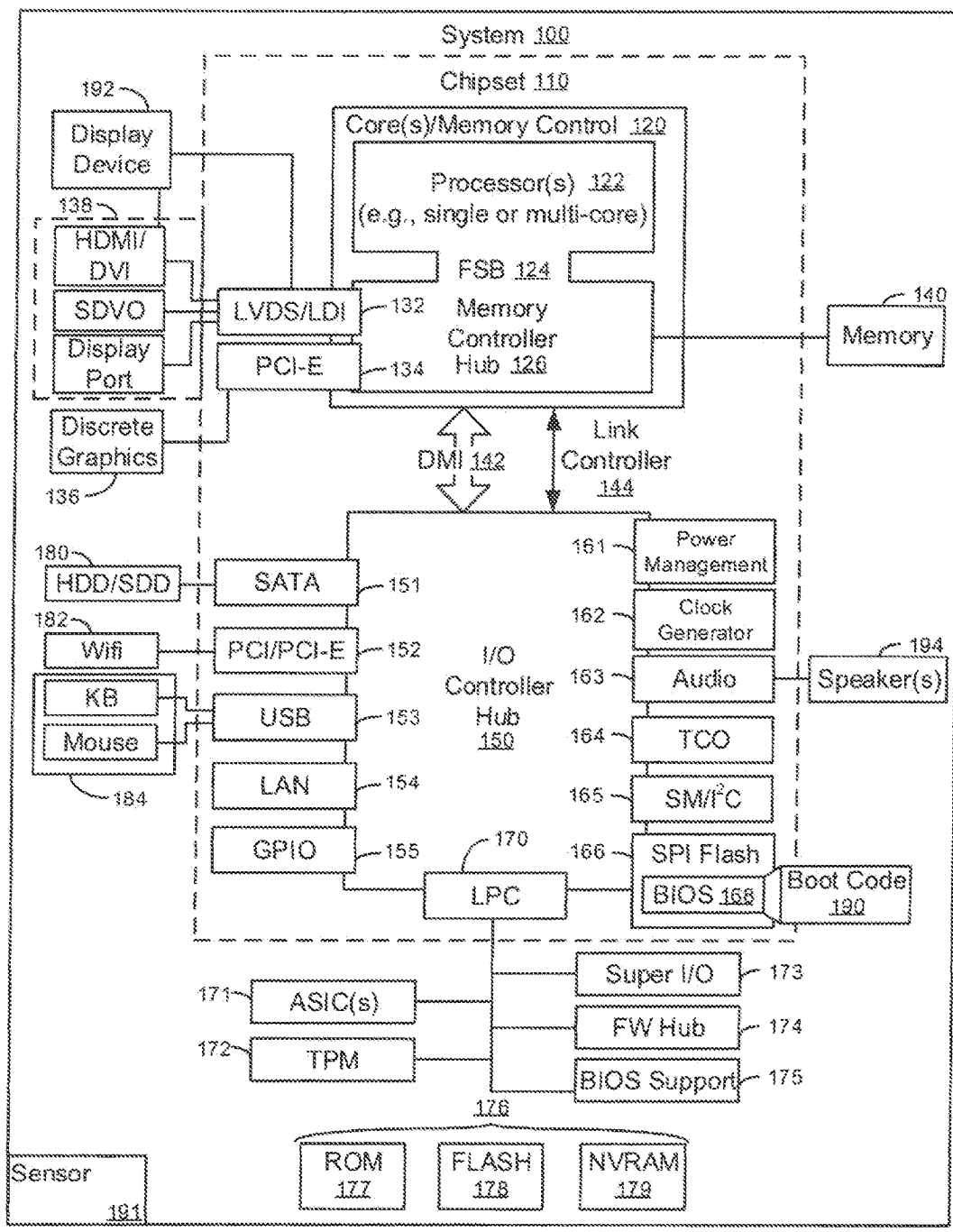
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart, phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program, that can access web applications hosted by the Internet servers over a network such as the Internet, a local intranet or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gates or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random, access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor ears access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital, to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the Yoga™ series of convertible computers or a ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®. Or, the system 100 may include a wireless telephone, notebook computer, or other portable computerized device.

As shown in FIG. 1, the system 100 may include a so-called chipset 110. A chipset refers to a group of integrated circuits, or chips, that are designed to work-together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and/memory control group 120 and an I/O controller hub 150 that exchange information (e.g., data, signals, commands, etc.) via, for example, a direct management interlace or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc,). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, an organic light emitting diode (LED) display, a red green blue (RGB) LED display, another wide color gamut display, etc.). A block 138 includes some examples of technologies that may be supported via the LVDS interface 132 (e.g., serial digital video, HDMI/DVI, display port). The memory controller hub 126 also includes one or more PCI-express interlaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An, example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LFC) interface 170, a power management Interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include at least one sensor 191 for sensing users proximate to the device. The sensor(s) 191 may include a camera for gathering one or more images of users and providing input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. In addition to or in lieu of the foregoing, the sensor(s) 191 may include biometric sensors (e.g., fingerprint sensors, retina sensors, etc.), laser range finders, sonar transceivers, proximity sensors, heat sensors, etc.

Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, and an audio receiver/microphone providing input to the processor 122 based on, e.g., a user providing audible input to the microphone. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
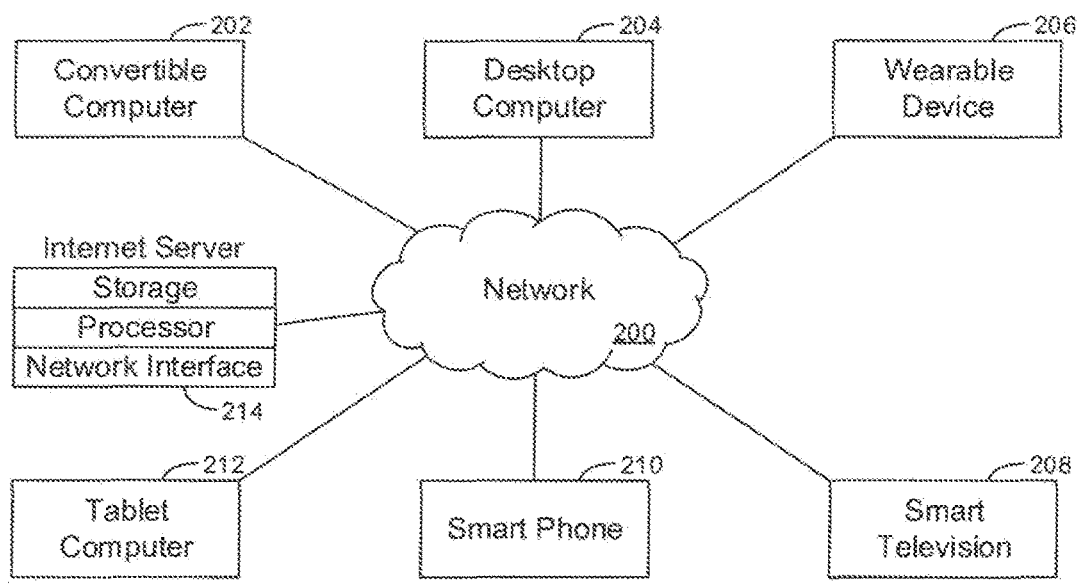
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook, computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212.

Figure 3:
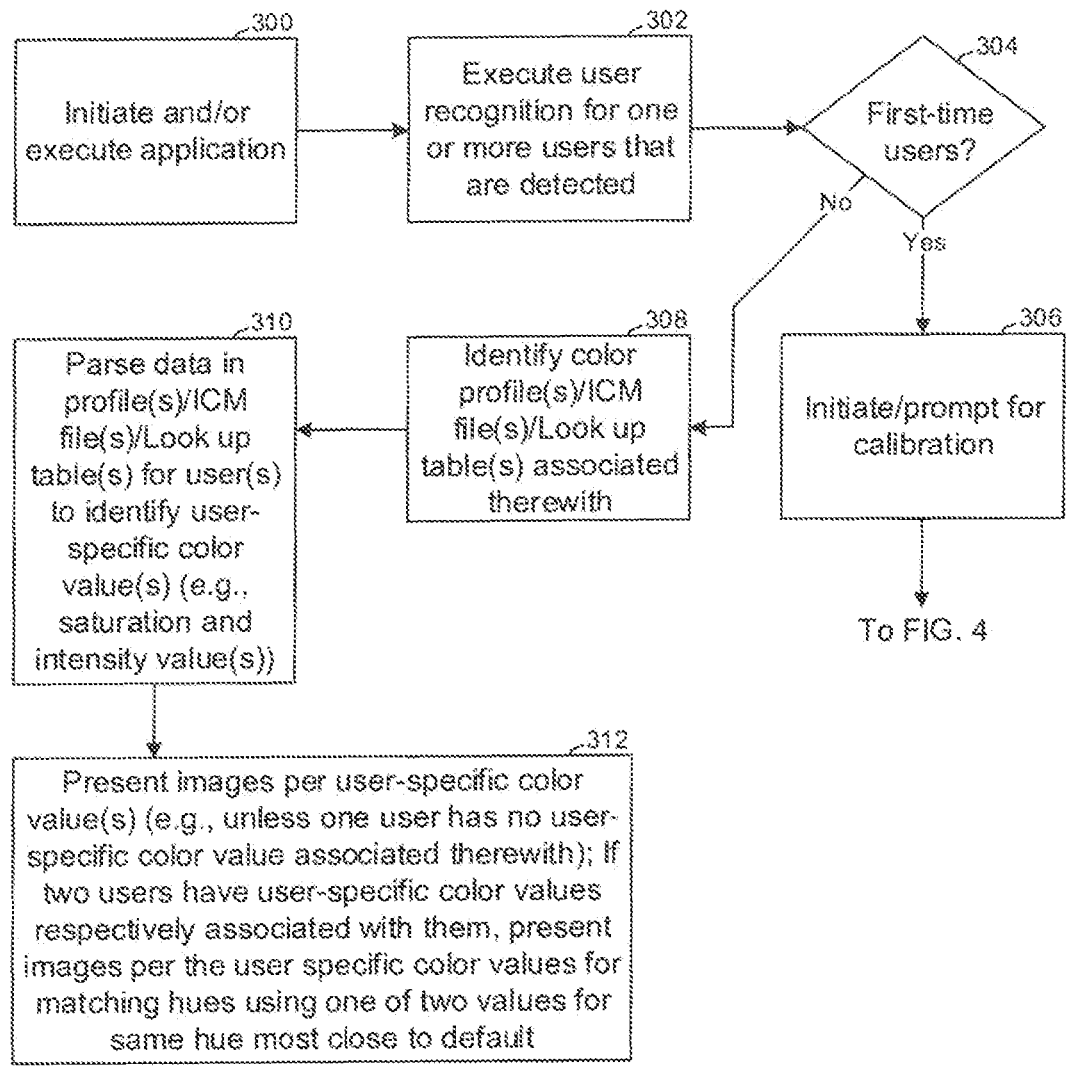
FIGS. 3 and 4 are flow charts showing example algorithms in accordance with present principles.

Referring to FIG. 3, it shows example logic that may be undertaken by a device such as the system 100 in accordance with present principles (referred to below as the "present device"). Beginning at block 300, the logic initiates and/or executes one or more applications for undertaking present principles, such as graphics rendering applications, user recognition applications, etc. The logic then proceeds to block 302 where the logic performs user recognition (e.g., responsive to detecting movement, and/or detecting a person as being present at least proximate to the present device) to identify one or more users. User recognition may be done, e.g., by extracting data pertaining to a face from an image that is received from a camera on the present device and comparing the data to reference data (e.g., stored at the present device or in cloud storage accessible to the present device) associated with respective users to identify a user based on a match of the extracted data to at least a portion of the reference data.

From block 302 the logic proceeds to decision diamond 304. At diamond 304 the logic determines whether one or more users that are detected are first-time users of the device. This determination may be made responsive to being unable to recognize a user at block 302, and/or if the user has been recognized but has not used the present device in the past or has not had user-specific color reference data established in the past. An affirmative determination at diamond 304 causes the logic to move to block 306 where the logic initiates a calibration feature and/or process for a user to provide input to establish user-specific color reference data. Calibration features and processes will be discussed further below.

However, if the logic determines at diamond 304 that the detected person is not a first-time user, the logic moves from diamond 304 to block 308. At block 308 the logic, identifies (e.g., from storage) reference data associated with, the identified user(s), a three dimensional (3D) lookup table (LUT) tailored to the user and/or an image color matching (ICM) file tailored to the user (e.g., containing a color system profile tailored to the user, and/or for use by a particular application or device) and pointing to the 3D LUT's location and/or referencing the 3D LUT. The reference data that is identified at block 308 may also include other reference data such as a user profile and/or profile information (e.g., other than an ICM file, such as an International Color Consortium (ICC) profile) pertaining to the user's ability to view certain colors and/or certain ranges within various hues, and/or also pointing to the user-specific 3D LUT.

Thereafter, the logic proceeds to block 310. At block 310 the logic parses data in the ICM file(s), 3D LUT(s), and/or profile(s) identified at block 308 to identify color values tailored to the identified user and then at block 312 presents images per the user-specific color value(s). For instance, the color values may be identified from a 3D LUT associated with the user and containing data pertaining to color saturation and/or hue (e.g., values for ranges that are to be more deeply saturated due to a user's deficiency in being-able to otherwise adequately view colors within the ranges as would be presented by default and/or without using data accounting for the users deficiency(s)). The color values from the 3D LUT may then be used by the present device's GPU to calculate color transformations, and/or perform color mapping and/or color space conversions, and then the calculations, etc. may be used to control and/or adjust output from display pixels and thus render more deeply saturated colors.

The color values may also pertain to color intensity so that, for example, if the user has difficulty viewing a particular range of colors, colors within that range may have their intensity increased by increasing the output intensity of corresponding bits in display pixels to be used, to present colors within that range, and thus more luminously output light. Thus, it is to be understood that, displays may be used in accordance with present principles that have localized, intelligent backlighting capability and/or have pixels that are locally and/or Individually controllable by a processor and/or GPU for such purposes. Furthermore, dynamic histogram equalization to boost and/or reduce black levels may also be used for such purposes, and thus such histograms may be included in the present device as a plug-in to the present device's graphics driver.

Further describing what occurs at block 312, note that if two or more users that were identified at block 302 (and/or identified as concurrently looking at the display) and at least one of the users is determined to not have any associated color profiles, ICM files, 3D LUTs, etc, accessible to the present device that are tailored to their viewing ability, the logic may present images on the display, e.g., using a standard and/or default 3D LUT for the present device (or otherwise using default color transformations), rather than using one tailored to a particular user.

Further still, if two or more users identified at block 302 (and/or identified as concurrently looking at the display) are each respectively associated with color profiles, ICM fries, 3D LUTs, etc. accessible to the present, device, the logic may determine whether there is any overlap of commonly shared color vision deficiencies between the two (e.g., via a color value comparison), such as any common hues/colors and/or color ranges that are to have their saturation and/or intensity altered. If so, the logic may determine which of the two color profiles, etc. if used would result in relatively less saturation and/or intensity adjustment than the other (e.g., for a given hue) relative to default values that would otherwise be used, and use that one of the two color profiles, etc. to present images on the display. If not, the logic may either decline to user either one and present images per default and/or standard values, or the logic may use the respective profiles, etc. for each user and present images per both sets of data.

Figure 4:
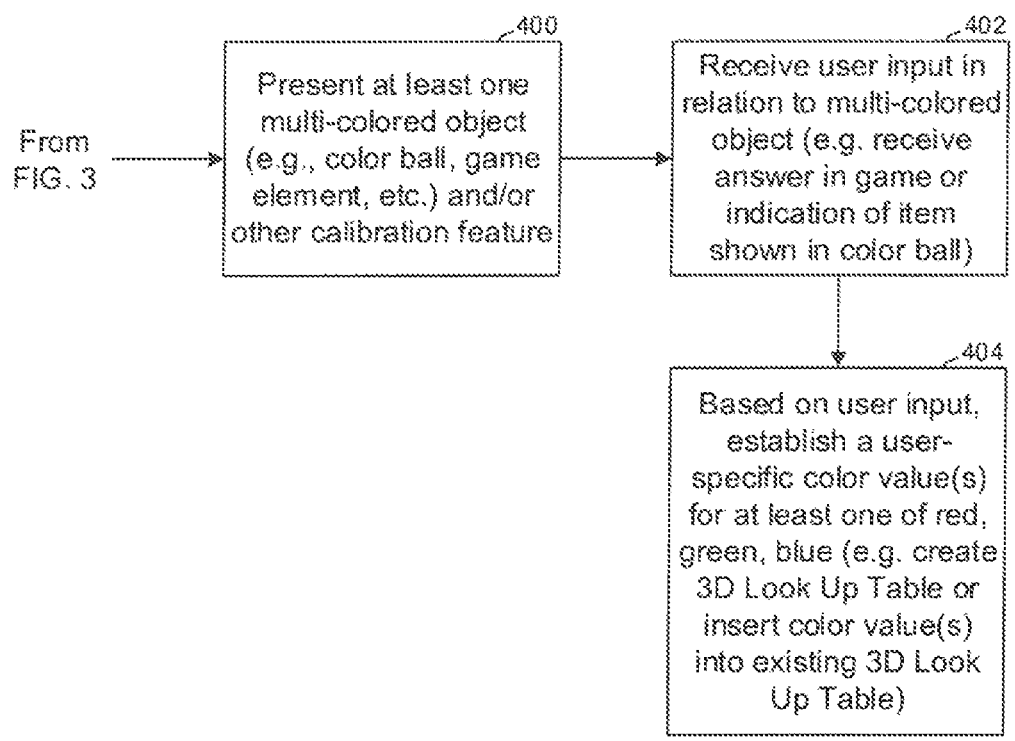

Continuing the detailed description now in reference to FIG. 4, it shows example calibration logic for a user to provide input to establish user-specific color reference data. The logic begins at block 400, which may have been arrived at from block 306 as described above. However, also note that the logic of FIG. 4 may be initiated, e.g., in response to receipt of user input to establish user-specific color reference data such as input to element 506 of the user interface (UI) shown in FIG. 5, which will be discussed shortly.

In any ease, at block 400 the logic presents at least one multi-colored object on a display. The multi-colored objects may be, e.g. color balls such as Ishihara color test plates used to execute one or more color perception tests and identify color deficiencies based on user input received at block 402. The multi-colored objects may also be elements, features, and/or user interfaces (UI) presented on the display that are made into a game for play by the user, where the user provides input that is received at block 402 to play the game and the input is then used identify color deficiencies.

Thus, once the requested user input is received at block 402, the logic moves to block 404. At block 404 the logic establishes user-specific color values for red, green, and/or blue colors based on the user input and/or results of the color perception tests. For example, at block 404 the logic may create a 3D LUT with certain color values being boosted, and/or changed from their defaults (e.g., if a default 3D LUT was used as a template for the user-specific 3D LUT), per the user's color vision deficiency(s). As another example, at block 404 the logic may alter an existing (e.g., default) 3D LUT by replacing default color values with user-specific ones and/or otherwise insetting user-specific color values. Also at block 404, the logic may create a user profile, ICM file, etc. also accessible by the device's GPU to adjust display output to conform to the user's color vision deficiency(s).

Figure 5:
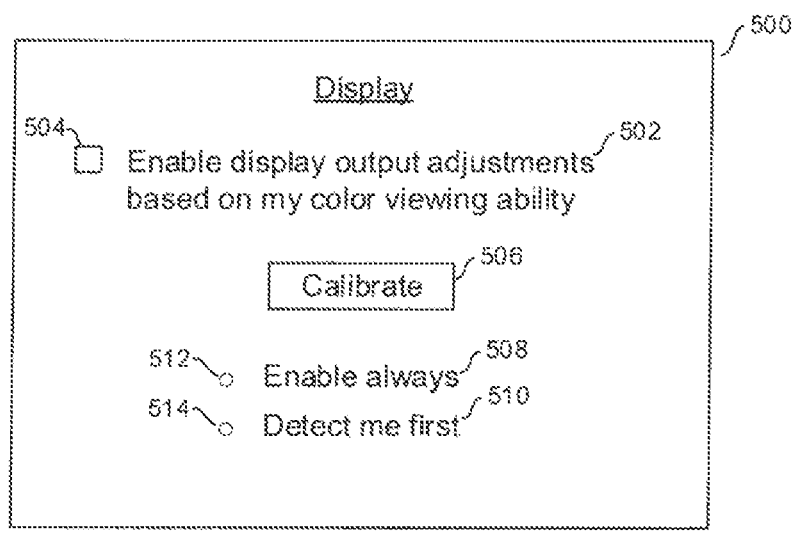
FIGS. 5-11 are example user interfaces (UIs) in accordance with present principles.

Reference is now made to FIG. 5, which shows an example user interface (UI) 500 presentable on a display accessible to a device undertaking present principles. The UI 500 may be presented as a stand-alone UI and/or may be presented as part of a settings UI for adjusting settings of the device. Regardless, the UI 500 contains an option 502 to enable display output adjustments based on a user's color viewing ability (e.g., to use user-specific 3D LUTs as discussed herein). The option 502 may be enabled by the user based on selection of check box 504. If not enabled, e.g., in some embodiments the device may present images on the display per default values.

The UI 500 also includes a selector 506 selectable by a user to, without further user input, initiate a calibration to establish user-specific reference data and/or user-specific color values. Thus, in one example, selection of selector 506 may command the device to initiate the logic of FIG. 4.

As may also be appreciated from FIG. 5, the UI 500 may also include options 508 and 510 respectively selectable using the radio buttons 512 and 514 shown to either command the device to always (e.g., at least until contrary user input is received) adjust display output per user-specific color values (option 508), or to do so responsive to detecting and/or identifying the user (e.g., based on images from a camera) and otherwise presenting images per default values.

Before moving on to the description of other FIGS., it is to be understood in accordance with present principles that a user may be permitted to switch ICM files and/or 3D LUTs that are used to present images (e.g., word processing documents, internet browsers, photographs, etc.). For Instance, plural selectors may be presented on the UI 500, each of winch is associated with a different user, profile, ICM file, and/or 3D LUT. Selection of one of the selectors configures the device to present images per that respective user, profile, ICM file, and/or 3D LUT associated with the selected selector.

Figure 6:
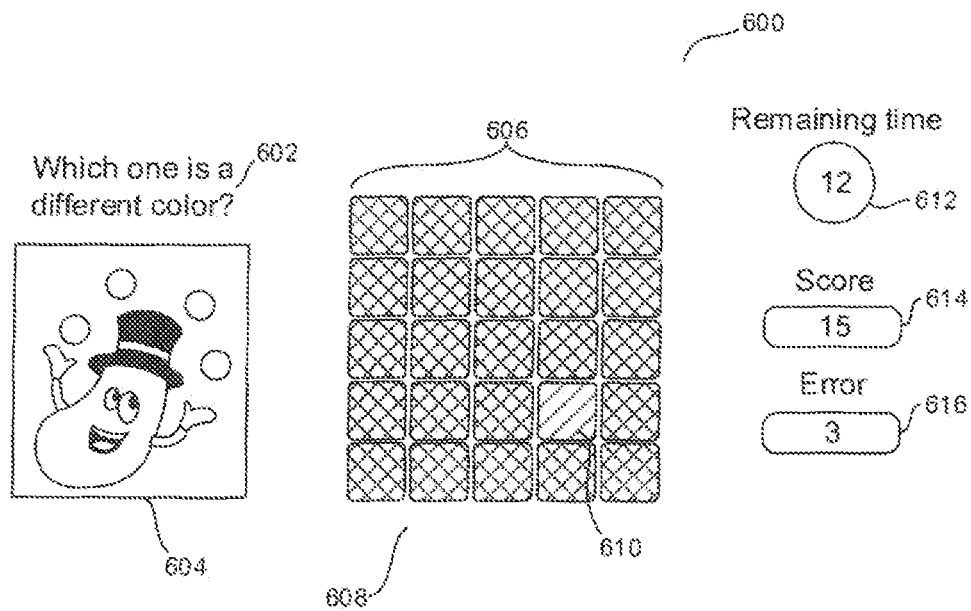
Figure 7:
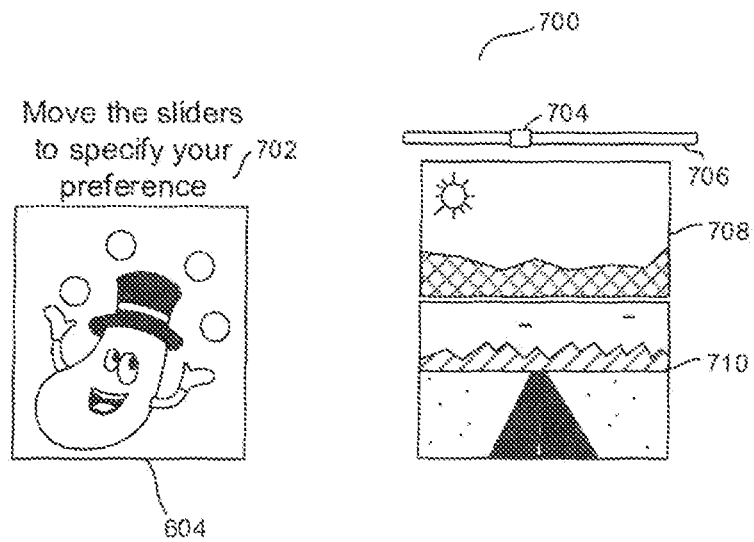

Moving on, FIGS. 6 and 7 illustrate example UIs for a game that may be played by a user for a device undertaking present principles to identify the user's possible color vision deficiencies and establish user-specific reference data accordingly. The UI 600 shown in FIG. 6 includes a prompt 602 (shown as a speech bubble coming from color genie 604) to select which of plural squares 606 in grid 608 is a different color than the rest of the squares 606. It may not be optimally appreciated from FIGS. 6 and 7 owing to the USPTO's requirement that drawings generally be in black and white, but the squares 606 are to be understood to be the same shade of green except for square 610, which is to be understood as being a slightly darker green relative to the other squares 606. Thus, while a user with at least relatively normal color vision ability for perceiving greens would be able to distinguish square 610 from the others and select it (e.g., based on touch input), a user with a green color vision deficiency may not be able to perceive that square 610 is a darker green than the other squares 606.

A series of UIs similar to the UI 600 and testing and/or attacking a user's color perception ability may be presented by, at least initially, testing along known and/or industry-recognized lines of color confusion for anomalous trichromatism (of which the UI 600 is one example) to thus evaluate the full extent of the user s possible color vision deficiency issues, such as a green color vision deficiency. A timer may be used for receipt of input for each UI before expiration of the timer as part of the game (an example timer representation 612 is shown in FIG. 6 that shows the time to select the "different" square 606), and if the timer expires without the correct user selection being received (and/or without any selection being received), the device may determine that the color shown for square 610 cannot be perceived and hence identify at least one color (the color of the square 610) that needs to be more deeply saturated when presenting images to the user on a display.

If a series of UIs are presented (e.g., to determine any deficiencies in red and blue colors in addition to green), a counter 614 of correct answers for the UIs may be presented, along with a counter 616 of incorrect answers (e.g., each time the user selects an incorrect square), for a user to thus engage in a game where the user attempts to reach a certain winning number of correct answers. Alternatively, the number of UIs presented may be based on how well a user distinguishes between colors of the same hue, so that if the user cannot distinguish well or at all, less UIs may be presented for narrowing in on the user's color vision deficiency because it would be determined to be relatively wide.

After one or more lines/ranges of color confusion are identified using such UIs (of which the UI 600 is an example), the UI 700 may be presented. The UI 700 may again show the genie 604, this time with a prompt 702 (shown as a speech bubble coming from color genie 604) to move a slider 704 along a bar 706 representing a color range for a particular hue, in this case green, to a user-desired level of color saturation for the dual images 708, 710 shown. Thus, the user's input from the series of UIs described above may be used to identify a range for a given hue at which the user's color vision ability for the hue it estimated to go from normal to deficient, or otherwise be borderline where the user has difficulty resolving colors, and the target colors and accordingly the color range represented by the bar 706 that narrows in on this range will vary depending on the user's input to the series of UIs described in the paragraphs above.

For example, if the user is challenged to see some red colors, the color/saturation slide bar would allow a finer level of identification of red colors that the user has trouble adequately viewing. If the user has color viewing deficiencies for both red and green, the slide bar may represent a relatively expanded color gamut (e.g., from sRGB to Adobe). For example, the color space triangle to be used for the user may be expanded or shrunk depending on the user's cone cell strength (for L, M, and/or N cones) for their eyes. However, also in some embodiments, if the user has color viewing deficiencies for both, e.g., red and green, respective slide bars may be presented for each color for manipulation of each one individually to reach desired levels of color saturation for each one.

Before moving on to the description of other figures, it is to be understood in reference to FIG. 7 that, although not shown for clarity, in some embodiments a second slider may also be presented for adjusting intensity for the user-desired level of color saturation. But regardless of whether such a slider is included or not, once the user selects his or her desired level of color saturation (e.g., for a given hue), the device may use that level of saturation to generate a unique LUT that the device's GPU may then use and reference to drive the display accordingly. In some embodiments, such a LUT may be established as a plug-in for a GPU driver.

Figure 8:
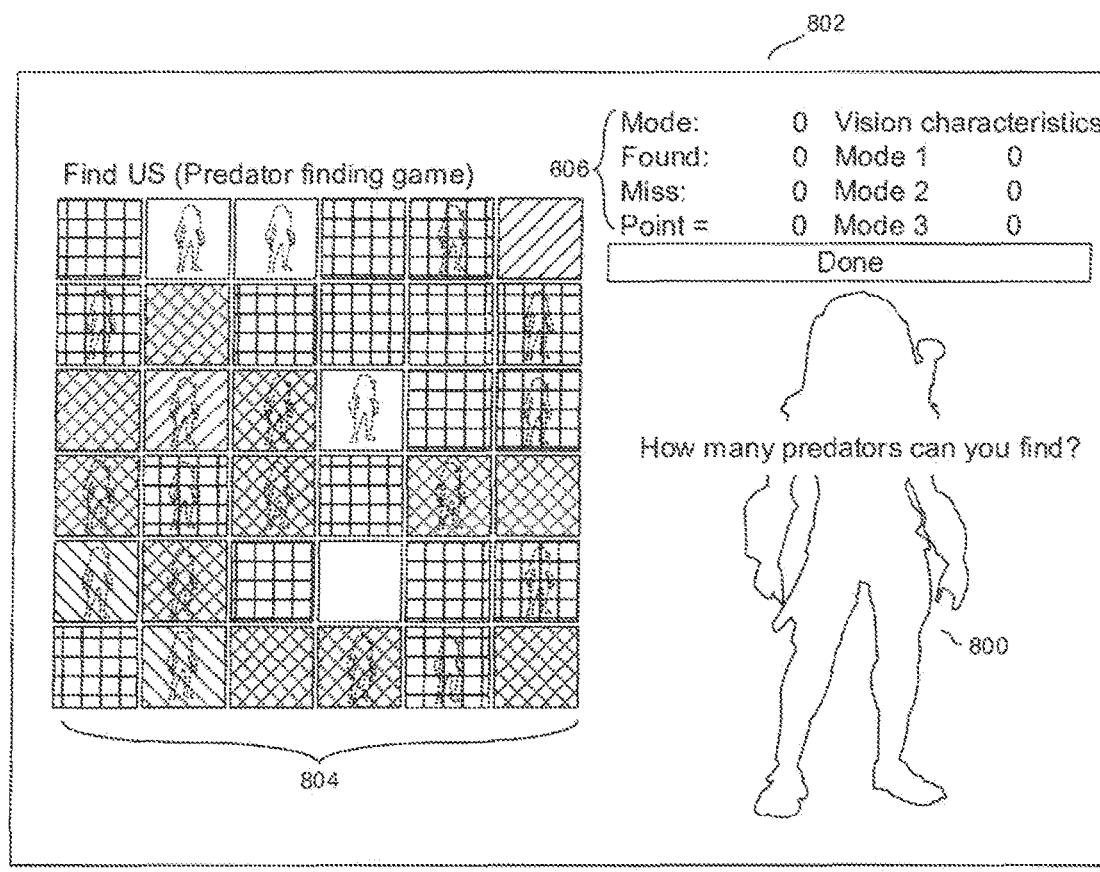
Figure 9:
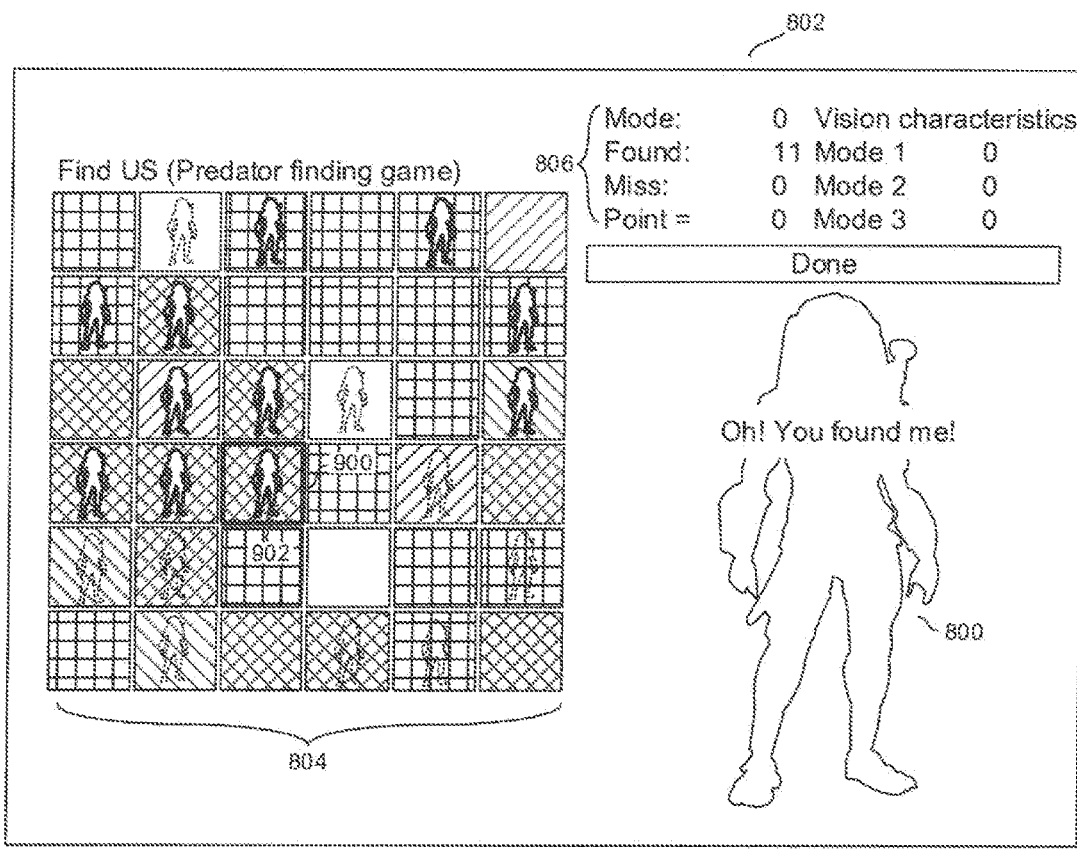
Figure 10:
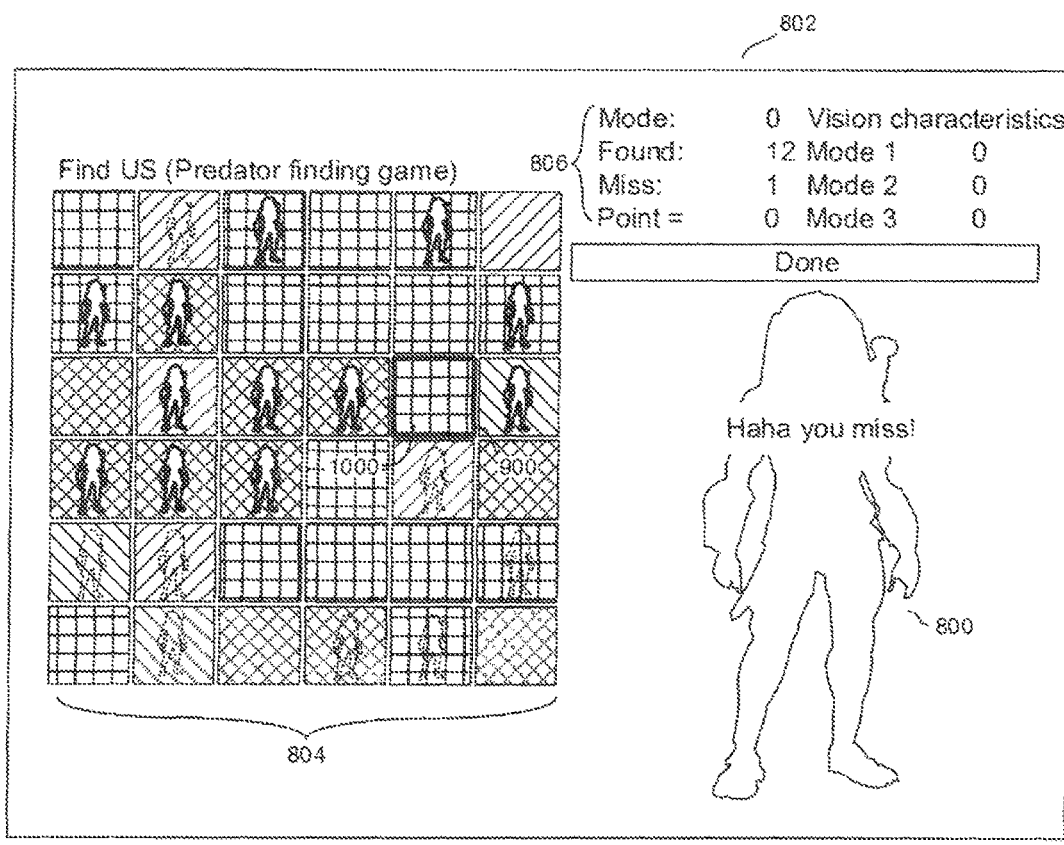

Now in reference to FIGS. 8-11, they show another example of a game that may be played by a user to identify one or more lines of a user's color vision deficiency in accordance with present principles. FIGS. 8 through 10 sequentially show various stages of such a game. In the UI 802 as shown in FIG. 8, a predatory FIG. 800 challenges the user to find images (e.g., a miniaturized outline/shadow, relative to the FIG. 800 as shown) of the predatory figure respectively shown in some but not all of the boxes 804. Again, though hard to tell owing to these figures being in black and white, in example embodiments the boxes may each be presented in one of various colors from one or more of blue hues, red hues, orange hues, yellow hues, and green hues. Thus, the boxes 804 may include some boxes of various green colors, some of various blue colors, etc. Within the respective outlines of the predatory figure that is shown in some but not all the boxes 804, the inner color for the predatory figure may be a darker or lighter color of the same hue as the rest of the box 804 in which the particular outline of the predatory figure is shown.

Based on whether the user correctly selects boxes 804 that respectively have outlines of the predatory figure inside them, the device is able to identify areas/saturations of color that the user has difficulty viewing to later establish a LUT and/or other reference data. Thus, statistics area 806 may include things such as the number of correct box selections and the number of incorrect box selections (e.g., those boxes selected that do not contain an outline of the predatory figure).

Reference is now made to FIG. 9, which shows actual miniaturized images of the predatory figure, rather than merely an outline, in boxes that were correctly selected by the user as containing the outline to thus indicate a correct selection. Cursor 900 surrounding box 902 indicates the most-recent box selection, and the predatory figure's caption, indicates that the user made a correct selection ("Oh! You found me!!"). FIG. 9 also shows in statistics area 806 that the user has identified the outline of the predatory figure from eleven of the boxes 804.

Turning now to FIG. 10, after making the correct selection discussed above in reference to FIG. 9, the user has now made an incorrect selection (box 1000, surrounded by cursor 900) by selecting a box which did not contain an outline of the predatory figure. Responsive to the incorrect selection, the predatory figure's caption indicates that the user made an incorrect selection ("Haha you miss!"). Also note that the statistics area 804 has been updated to reflect one incorrect selection.

Figure 11:
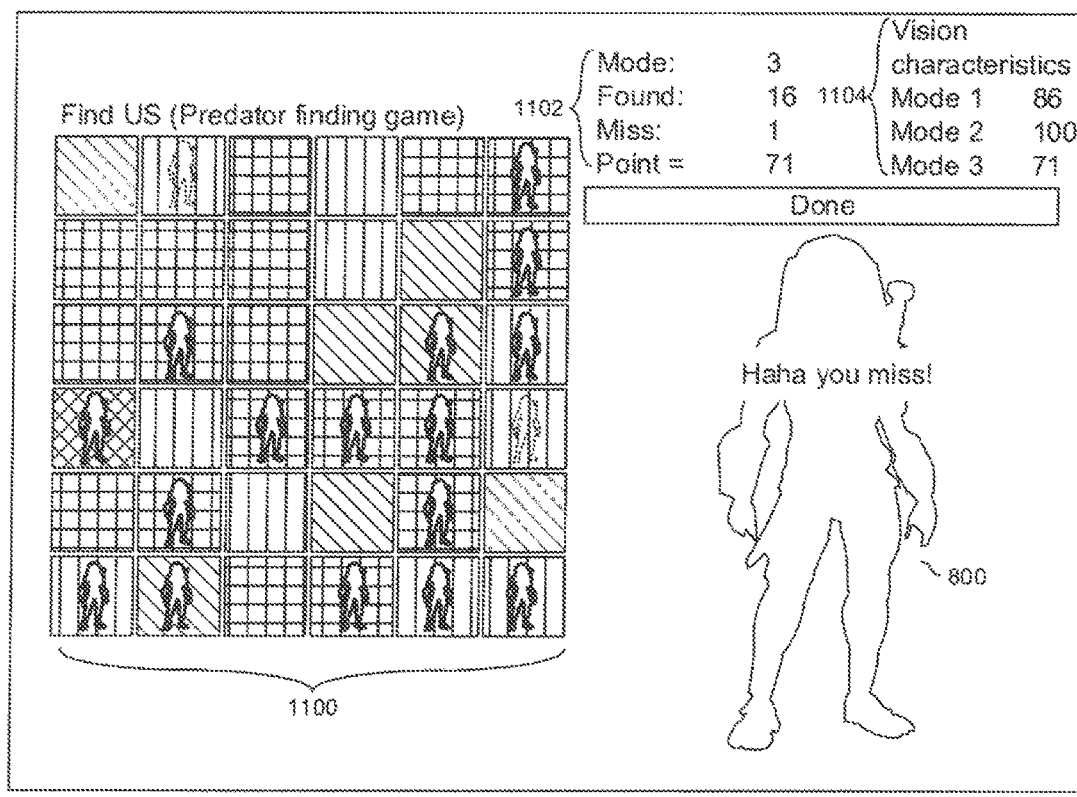

Moving on to FIG. 11, if shows another example of the predatory figure-finding game, albeit with different box selections than were shown in FIGS. 8-10. Further distinguishing FIG. 11, if is to be understood that these boxes 1100 are each colored one of various pastel colors in the hues of red, blue, and green (e.g., plural green pastel boxes of different green colors, plural blue pastel boxes of different blue colors, and plural red pastel boxes of red different colors). Boxes that have already been correctly identified by the user as containing a predatory figure outline now show more detailed images of the predatory figure to connote correct selections, and a statistics area 1102 notes numbers of correct and incorrect selections. Also note that vision characteristics section 1104 indicates respective vision characteristics for the user determined based on the user playing the game. "Mode 1" notes a CVD rating for the color confusion line for Protanope (e.g., imperfect perception of reds), "Mode 2" notes a CVD rating for the color confusion line for Deuteranope (e.g., with only two retinal cone pigments instead of three, a complete insensitivity to middle wavelengths (e.g., greens)), and "Mode 3" notes a CVD rating for the color confusion line for Tritanope (e.g., inability to discern blues and yellows).

These ratings may then be used in example embodiments to establish reference data as disclosed herein. For example, if the user's Mode 1 rating is below an average (e.g., for the general population), the device may determine that red colors need to be more saturated when presented for the user on the display. The amount the user's rating is below the average rating may correlate to and/or determine the amount of additional saturation to be used, and/or the amount of a color value increase to be made for a given data point in a 3D LUT.

It may now be appreciated that present principles provide for enhancing the visual experience of people with CVD (or for anyone, for that matter, that wants to change saturation and intensity for presentation of images on a display) by displaying more deeply saturated reds and greens, and in some instances, blues, and/or by varying the intensify of those colors. Wide color gamut displays may be used in some embodiments as well so that, e.g., reds and greens may be "stretched" into higher levels of saturation (e.g., to make them appear more vivid) than if using a display with a lesser color gamut than a wide color gamut display. However, it is to nonetheless be understood that such displays (other than so-called wide color gamut displays) may still be used in accordance with present principles.

In any case, CVD test patterns and/or games may be used with which the user interacts to provide information for a device and/or application to define a new unique color profile setting for that user. This dynamic feedback from the user allows such a device and/or application to steer toward art optimal viewing experience for the user. This device and/or application may interact with and/or establish a color management engine to set .icm files and associated graphics Look-Up Tables (LUT) for different users and to set custom color profiles. The device and/or application may Daltonize images on loading (e.g., change the saturation and/or intensity of certain image elements to help a CVD person distinguish details of a picture). Users who are challenged to see reds and greens are thus provided with a way to shift the spectrum to more saturated reds and/or greens to compensate for their weak cones and to change intensity to help distinguish details of an image.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular PRESENTATION OF IMAGES ON DISPLAY BASED ON USER-SPECIFIC COLOR VALUE (S) is herein shown and described in detail, it is to be understood that the subject matter which is encompassed by the present application is limited only by the claims.

What is claimed is:

1. A device, comprising:
   at least one processor;
   a display accessible to the at least one processor; and
   storage accessible to the at least one processor and bearing instructions executable by the at least one processor to:
   access data pertaining to at least one user-specific color value for output of one or more of red light, green light, and blue light;
   individually control pixels of the display to present images on the display based at least in part on the at least one user-specific color value for one or more of red light, green light, and blue light; and
   execute dynamic histogram equalization to at least one of boost black levels of the images and reduce black levels of the images.

2. The device of claim 1, wherein the instructions are executable by the at least one processor to:
   present a user interface (UI) on the display, the UI comprising an option that is selectable to command the device to render images based on the user's color viewing ability.

3. The device of claim 1, wherein the instructions are executable by the at least one processor to:
   present, on the display, at least one multi-colored object;
   receive, from a user, input in relation to the multi-colored object; and
   based at least in part on the input, establish the data;
   wherein the data comprises a three dimensional (3D) lookup table (LUT); and wherein the data comprises an image color matching (ICM) file that references the 3D LUT.

4. The device of claim 3, wherein the ICM file references the 3D LUT at least in part by indicating a location at which the 3D LUT is accessible.

5. The device of claim 3, wherein the data comprises a profile that references the 3D LUT and is associated with the user.

6. The device of claim 3, wherein at least one color value is inserted into the 3D LUT.

7. The device of claim 3, wherein the at least one multi-colored object is presented as part of a game for play on the device.

8. The device of claim 1, wherein the display is an organic light emitting diode (LED) display.

9. The device of claim 1, wherein the instructions are executable by the at least one processor to:
   individually control pixels of the display by individually controlling the intensity of light from the pixels so that, based on the at least one user-specific color value, a first pixel of the display outputs light at a different intensity than a second pixel of the display.

10. The device of claim 9, wherein the intensity of light from the pixels is individually controlled instead of using one or more display backlights to control light intensity.

11. The device of claim 9, wherein the instructions are executable by the at least one processor to:
    individually control pixels of the display to increase the intensity of a particular range of colors indicated in the data.

12. The device of claim 1, wherein the dynamic histogram equalization is executed using a plug-in for a graphics driver of the device.

13. The device of claim 1, wherein the instructions are executable by the at least one processor to:
    present a user interface (UI) on the display, the UI comprising a first selector that is selectable to select first user-specific color data to use to present images on the display, the UI comprising a second selector that is selectable to select second user-specific color data to use to present images on the display, the first user-specific color data being different from the second user-specific color data, the first user-specific color data being associated with a first user that is different from a second user that is associated with the second user-specific color data; and
    based on selection of one of the first and second selectors, access the respective user-specific color data for the selected selector and present images on the display based at least in part on the respective user-specific color data for the selected selector.

14. A computer-implemented method, comprising:
    accessing data pertaining to at least one user-specific color value for output of one or more of red light, green light, and blue light;
    presenting at least a first image on an electronic display at least in part by controlling pixels of the electronic display individually so that, according to the at least one user-specific color value, the luminosity of a first pixel of the electronic display is different from the luminosity of a second pixel of the electronic display while the electronic display presents the first image; and
    performing histogram equalization to at least one of boost black levels of the images and reduce black levels of the images.

15. The computer-implemented method of claim 14, wherein the luminosity of the first and second pixels are controlled individually instead of using one or more display backlights to control luminosity.

16. The computer-implemented method of claim 14, wherein the electronic display is an organic light emitting diode (LED) display.

17. The computer-implemented method of claim 14, comprising:
controlling pixels of the electronic display individually to increase the intensity of a particular range of colors indicated in the data.

18. The computer-implemented method of claim 14, comprising:
presenting a user interface (UI) on the display, the UI comprising a first selector that is selectable to select first user-specific color data to use to present images on the display, the UI comprising a second selector that is selectable to select second user-specific color data to use to present images on the display, the first user-specific color data being different from the second user-specific color data, the first user-specific color data being associated with a first user that is different from a second user that is associated with the second user-specific color data; and
based on selection of one of the first and second selectors, accessing the respective user-specific color data for the selected selector and presenting images on the display based at least in part on the respective user-specific color data for the selected selector.

19. A computer readable storage medium (CRSM) that is not a transitory signal, the computer readable storage medium comprising instructions executable by at least one processor of a device to:
present a user interface (UI) on a display accessible to the at least one processor, the UI comprising a first selector that is selectable to select first user-specific color data to use to present images on the display, the UI comprising a second selector that is selectable to select second user-specific color data to use to present images on the display, the first user-specific color data being different from the second user-specific color data, the first user-specific color data being associated with a first user that is different from a second user that is associated with the second user-specific color data; and
based on selection of one of the first and second selectors, access the respective user-specific color data for the selected selector and present images on the display based at least in part on the respective user-specific color data for the selected selector.

20. The CRSM of claim 19, wherein the instructions are executable by the at least one processor to:
individually control the luminosity of pixels of the display to present images on the display based at least in part on the respective user-specific color value for the selected selector; and
execute dynamic histogram equalization to at least one of boost black levels of the images and reduce black levels of the images.

* * * * *